United States Patent [19]

Kanaya et al.

[11] Patent Number: 4,541,299
[45] Date of Patent: Sep. 17, 1985

[54] STEERING SHAFT ASSEMBLY FOR AUTOMOTIVE VEHICLES

[75] Inventors: Takakuni Kanaya; Isao Kudo; Seiji Yokota, all of Toyota, Japan

[73] Assignee: Toyota Jidosha Kabushiki Kaisha, Aichi, Japan

[21] Appl. No.: 586,821

[22] Filed: Mar. 6, 1984

[30] Foreign Application Priority Data

Mar. 14, 1983 [JP] Japan ............................. 58-36722[U]

[51] Int. Cl.⁴ ............................................. B62D 1/18
[52] U.S. Cl. ...................................... 74/493; 74/492; 74/531; 280/775
[58] Field of Search ......................... 74/492, 493, 531; 188/371; 280/775

[56] References Cited

U.S. PATENT DOCUMENTS

| 2,226,656 | 12/1940 | Best | 74/493 |
|---|---|---|---|
| 2,227,821 | 1/1941 | Burrell | 74/493 |
| 3,396,599 | 8/1968 | Altmann | 74/492 |
| 3,491,614 | 1/1970 | Saunders | 74/493 |
| 3,492,888 | 2/1970 | Nishimura | 188/371 |
| 3,685,369 | 8/1972 | Adams | 74/492 |
| 3,791,233 | 2/1974 | Bane | 74/492 |
| 4,273,005 | 6/1981 | Strutt | 74/492 |
| 4,337,967 | 7/1982 | Yoshida | 74/493 |
| 4,406,176 | 9/1983 | Numazawa | 74/492 |
| 4,418,582 | 12/1983 | Martin | 74/493 |

FOREIGN PATENT DOCUMENTS 2413590 10/1975 Fed. Rep. of Germany ........ 74/492
120458 9/1981 Japan ..................................... 74/493

Primary Examiner—Ronald H. Lazarus
Attorney, Agent, or Firm—Parkhurst & Oliff

[57] ABSTRACT

A steering shaft assembly for automotive vehicles comprises an upper shaft mounted thereon with a steering wheel, a lower shaft rotatably supported in place within a column tube and telescopically connected to the upper shaft in such a manner to permit axial adjustment of the upper shaft, and a lock mechanism for releasably fastening the upper shaft to the lower shaft in its adjusted position, a pair of stopper elements respectively integral with the upper and lower shafts to be abutted against each other when the upper shaft is moved downward over a predetermined stroke, an annular tapered projection integral with one of the shafts, and a single shock absorber element of elastic material in the form of a short sleeve member coupled with the other shaft and located between the stopper elements. The shock absorber element is formed at one end thereof with an annular tapered portion to be resiliently coupled over the annular tapered projection by abutment with the stopper elements.

6 Claims, 5 Drawing Figures

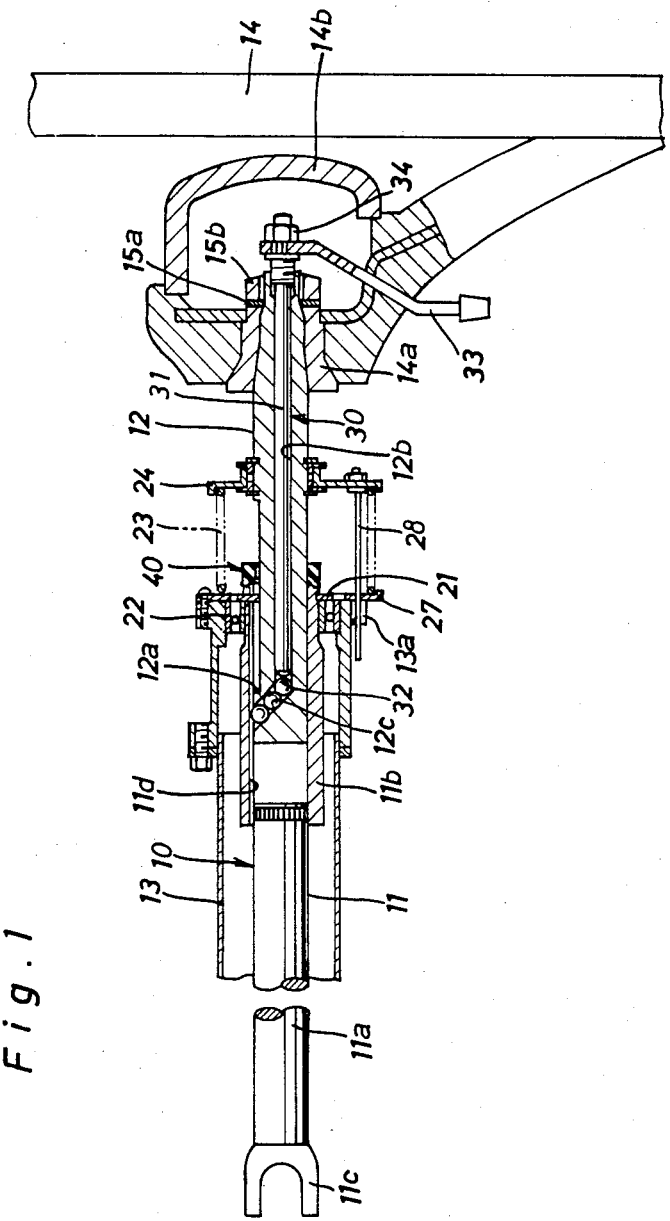

4,541,299

STEERING SHAFT ASSEMBLY FOR AUTOMOTIVE VEHICLES

BACKGROUND OF THE INVENTION

The present invention relates to a steering shaft assembly for automotive vehicles, and more particularly to a steering shaft assembly of the telescopic type adjustable in its axial direction.

A conventional steering shaft assembly of the telescopic type as described above comprises an upper shaft mounted thereon with a steering wheel, a lower shaft telescopically connected to the upper shaft, a lock mechanism for releasably fastening the upper shaft to the lower shaft at its adjusted position, and stopper means for restricting downward movement of the upper shaft over a predetermined stroke during adjustment of the shaft assembly. Such stopper means includes, in general, a pair of stopper elements which are arranged respectively integral with the upper and lower shafts to be abutted at a predetermined position. In adjustment of the steering shaft assembly, it has been experienced that when the upper shaft is moved to its downward stroke end, the steering wheel is applied with an impact caused by abutment of the stopper elements. Even if in the shaft assembly a single shock absorber element of elastic material was interposed between the stopper elements to absorb the impact acting on the steering wheel, sufficient effect would not be expected because the magnitude of such impact changes in dependence upon the downward movement speed of the upper shaft. For example, if such a shock absorber element was made of soft elastic material, it would be effective to absorb a relatively small impact but ineffective to absorb a large impact. Alternatively, if such a shock absorber element was made of hard elastic material, it would be effective to absorb a large impact but ineffective to absorb a relatively small impact.

SUMMARY OF THE INVENTION

It is, therefore, the primary object of the present invention to provide an improved steering shaft assembly of the telescopic type in which a single shock absorber element is arranged to cooperate with the stopper elements so as to effect sufficient absorption of various impacts acting on the steering wheel during adjustment of the shaft assembly.

According to the present invention there is provided a steering shaft assembly for automotive vehicles which comprises an upper shaft mounted thereon with a steering wheel, a lower shaft rotatably supported in place within a column tube and telescopically connected to the upper shaft in such a manner as to permit axial adjustment of the upper shaft, and a lock mechanism for releasably fastening the upper shaft to the lower shaft in its adjusted position, a pair of stopper elements respectively integral with the upper and lower shafts to be abutted against each other when the upper shaft is moved downward over a predetermined stroke, an annular tapered projection integral with one of the shafts, and a single shock absorber element of elastic material in the form of a sleeve member coupled with the other shaft and located between the stopper elements, in which the shock absorber element is formed at one end thereof with an annular tapered portion to be coupled over the annular tapered projection by abutment with the stopper elements.

In the actual practice of the present invention, it is preferable that one of the stopper elements is integrally provided on the upper end of the lower shaft, while the other stopper element is integrally provided on an intermediate portion of the upper shaft, and wherein the annular tapered projection is formed at the upper end of the lower shaft, and the shock absorber element is coupled with the upper shaft between the stopper elements.

BRIEF DESCRIPTION OF THE DRAWINGS

Further and more specific objects, features and advantages of the present invention and the manner in which the invention is carried into practice are made apparent in the following detailed description wherein reference is made to the accompanying drawings, in which:

FIG. 1 is a sectional view of a steering shaft assembly in accordance with the present invention;

DETAILED DESCRIPTION OF THE PREFERRED EMBODIMENTS

Figure 3:
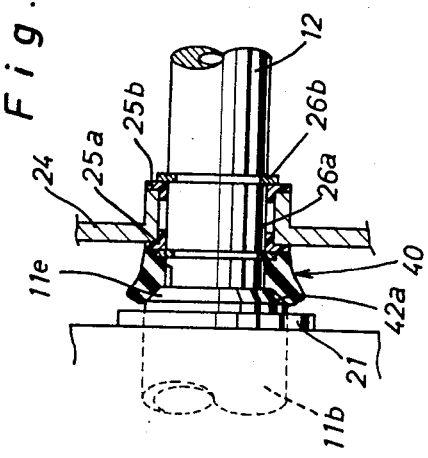
FIGS. 3 and 4 illustrate deformed conditions of the shock absorber element during adjustment of the steering shaft assembly.

Referring now to the drawings, FIG. 1 illustrates a steering shaft assembly of the telescopic type 10 in accordance with the present invention which includes lower and upper shafts 11 and 12. The lower shaft 11 includes a main shaft portion 11a, a cylindrical member 11b secured to the upper end of main shaft portion 11a, and a yoke portion 11c formed at the lower end of main shaft portion 11a. The cylindrical member 11b of lower shaft 11 is rotatably supported by a ball bearing 22 which is fixedly mounted within a stationary column tube member 13 fixed at an angle to a portion of a vehicle body structure, and the yoke portion 11c of lower shaft 11 is connected in a usual manner to a steering gear box (not shown). The upper shaft 12 is axially telescopically connected at its lower end with the cylindrical member 11b of lower shaft 11. A fastener ring 21 is fixed to the upper end portion of cylindrical member 11b and engaged with the upper shaft 12 to restrict relative rotation between lower and upper shafts 11 and 12. The fastener ring 21 is further in engagement with the ball bearings 22 to position the lower shaft 11 in its axial direction through the ball bearing 22, which ring 21 acts as a stopper element to restrict downward movement of the upper shaft 12 by abutment therewith.

A steering wheel 14 is coupled at its boss portion 14a with the upper end of shaft 12 and fastened in place by a nut 15b threaded over the upper end of shaft 12 through a washer 15a. An annular retainer member 24 is rotatably mounted on an intermediate portion of upper shaft 12 to receive one end of a compression coil spring 23. As can be well seen in FIG. 2, the annular retainer member 24 is supported by a pair of annular bushes 25a and 25b which are made of hard synthetic resin and positioned in place by means of a pair of fastener rings 26a and 26b fixed to the shaft 12. In this arrangement, the lower bush 25a and ring 26a act as another stopper element to restrict downward movement of the upper shaft 12 by abutment with the fastener ring 21 through a single shock absorber element 40 of elastic material such as rubber. An annular retainer member 27 is fixed to the upper end of stationary column tube 13 by screws and opposite to the annular retainer member 24 to receive the other end of compression coil spring 23. The compression coil spring 23 is located eccentrically with respect to the axis of upper shaft 12 in a predetermined distance to resiliently support thereon the upper shaft 12. A guide rod 28 in parallel with the upper shaft 12 is fixed at its one end to the annular retainer 24 and is slidably engaged at its other end with an axial groove 13a in the upper end of column tube 13 through a portion of annular retainer member 27 to restrict relative rotation of the annular retainer member 24 to the column tube 13. The upper shaft 12 is further provided at its outer periphery with an axial flat recess of a predetermined length the lower end of which is formed as a stepped stopper 12a to be abutted against an inner end of the fastener ring 21 in upward movement of the upper shaft 12 over the predetermined stroke.

A lock mechanism 30 is provided to releasably fasten the upper shaft 12 to the lower shaft 11 in its adjusted position, which mechanism 30 comprises an operation rod 31 disposed in an axial bore 12b of upper shaft 12, three metallic balls 32 contained within an oblique bore 12c extending outwardly from the lower end of axial bore 12b, and a manual lever 33 fixed to the upper end of rod 31. The operation rod 31 is axially slidable in the axial bore 12b and is retractably threaded at its upper end into the axial bore 12b of shaft 12. The oblique bore 12c in shaft 12 opens toward a portion of an axial groove 11d which is formed in the inner peripheral wall of the cylindrical member 11b of lower shaft 11. Thus, the outside ball 32 is arranged to engage the axial groove 11d of cylindrical member 11b upon operation of the manual lever 33. The manual lever 33 is connected at its one end with the upper end of shaft 12 and fastened in place by a nut 34. The outer end of manual lever 12 extends outwardly through a portion of a cover 14b fixed to the steering wheel 14. When the manual lever 33 is turned clockwisely, the operation rod 31 moves downward to press the balls 32 against the axial groove 11d of cylindrical member 11b and to retain them in their pressed positions. As a result, the upper shaft 12 is fastened to the lower shaft 11 in its adjusted position by frictional engagement of the outside ball 32 with the axial groove 11d. When the manual lever 33 is released counterclockwisely, the operation rod 31 retracts upward to release the balls 32 from the axial groove 11d of cylindrical member 11d. As a result, the frictional engagement of the ouside ball 32 with the axial groove 11d is released to permit axial adjustment of the upper shaft 12 relative to the lower shaft 11. Thus, the steering wheel 14 can be adjusted to a desired position in the axial direction of the shaft assembly. In such adjustment of the steering wheel 14, the compression coil spring 23 acts to prevent an excessive load acting on a portion between the shafts 11 and 12 to ensure smooth adjustment of the steering wheel 14.

Figure 2:
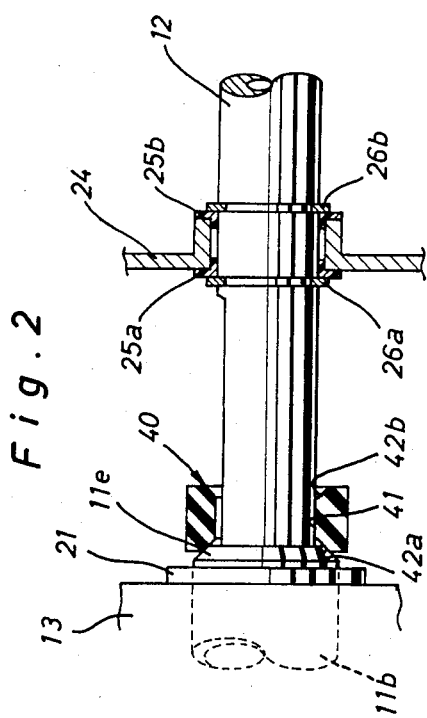
FIG. 2 is a partly enlarged sectional view illustrating a shock absorber element adapted to the steering shaft assembly of FIG. 1.

As can be well seen in FIG. 2, the single shock absorber element 40 is coupled with an intermediate portion of upper shaft 12, which is in the form of a short sleeve member arranged between the fastener ring 21 and the bush 25a. The sleeve-like shock absorber element 40 is formed with an axial bore 41 which is provided at the opposite ends thereof with a pair of tapered portions 42a and 42b. Meanwhile, the cylindrical member 11b of lower shaft 11 is formed at its upper end with an annular tapered shoulder 11e which confronts with the tapered portion 42a of shock absorber element 40. In this case, the length of tapered shoulder 11e is determined to be longer than that of the tapered portion 42a of element 40, and also the maximum diameter of tapered shoulder 11e is determined to be larger than that of tapered portion 42a of shock absorber element 40.

Figure 4:
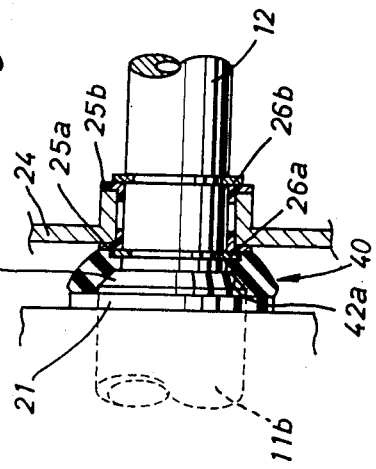

With the above arrangement of the shock absorber element 40, when the steering wheel 14 is pushed downward against compression coil spring 23 in adjustment of the steering shaft assembly, the bush 25a and retainer ring 26a abut against the shock absorber element 40 to subsequently abut it against the tapered shoulder 11e of cylindrical member 11b so as to restrict the downward movement of upper shaft 12 over the predetermined stroke. If in such operation, an impact force acting on the upper shaft 12 is relatively small, as shown in FIG. 3, the lower tapered portion 42a of element 40 will be coupled slightly over the tapered shoulder 11e of cylindrical member 11b and expanded radially to absorb the impact by its tensile strain. If an impact force acting on the upper shaft 12 is large, as shown in FIG. 4, the shock absorber element 40 will be axially pressed by abutment against the bush 25a and retainer ring 26a and expanded radially by the annular tapered shoulder 11e of cylindrical member 11b to absorb the impact by its pressed strain. From the above description, it will be understood that the shock absorber element 40 is deformed in accordance with the magnitude of impact acting thereon to ensure sufficient absorption of the impact.

Figure 5:
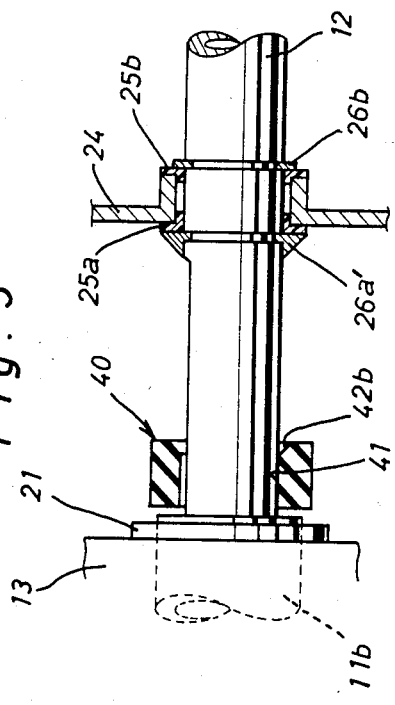
FIG. 5 illustrates a modification of the steering shaft assembly.

In FIG. 5 there is illustrated a modification of the steering shaft assembly in which the lower fastener ring 26a is replaced with a tapered fastener ring 26a', while the tapered portion 42a of element 40 and the tapered shoulder 11e of cylindrical member 11b are eliminated. In the actual practice of the present invention, the stopper elements 21, 11e and 25a, 26a may be replaced with other stopper elements in an appropriate manner, and the cylindrical member 11b of lower shaft 11 may be formed in a piece with the main shaft portion 11a of shaft 11.

Having now fully set forth both structure and operation of certain preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A steering shaft assembly for automotive vehicles, comprising: an upper shaft mounted thereon with a steering wheel, a lower shaft rotatably supported in place within a column tube and telescopically connected to said upper shaft in such a manner as to permit axial adjustment of said upper shaft, and a lock mechanism for releasably fastening said upper shaft to said lower shaft in its adjusted position, wherein said steering shaft assembly comprises a pair of stopper elements respectively integral with said upper and lower shafts to be abutted against each other when said upper shaft is moved downward over a predetermined stroke; an annular tapered projection integral with one of said shafts; and a single shock absorber element of elastic material in the form of a sleeve member coupled with the other shaft and located between said stopper elements, said shock absorber element being formed at one end thereof with an annular tapered portion to be coupled over said annular tapered projection by abutment with said stopper elements.

2. A steering shaft assembly as set forth in claim 1, wherein one of said stopper elements is integrally provided on the upper end of said lower shaft, while the other stopper element is integrally provided on an intermediate portion of said upper shaft, and wherein said annular tapered projection is formed at the upper end of said lower shaft, and said shock absorber element is coupled with said upper shaft between said stopper elements.

3. A steering shaft assembly as set forth in claim 1, further comprising an upper retainer member rotatably mounted on an intermediate portion of said upper shaft and fixed in place in its axial direction, a lower retainer member fixed to the upper end portion of said column tube, and a compression coil spring interposed between said retainer members to bias said upper shaft when said lock mechanism is released, wherein one of said stopper elements is integrally provided on the upper end of said lower shaft, while the other stopper element is integrally provided on said upper shaft at said upper retainer member, and wherein said annular tapered projection is in the form of an annular tapered shoulder formed at the upper end of said lower shaft, and said shock absorber element is coupled with said upper shaft between the upper end of said lower shaft and said upper retainer member.

4. A steering shaft assembly as set forth in claim 3, wherein said annular tapered projection is in the form of an annular fastener ring fixed to said upper shaft to retain said upper retainer member in place.

5. A steering shaft assembly as set forth in claim 3, wherein said compression coil spring is arranged eccentrically with respect to the axis of said upper shaft, and a guide rod in parallel with said upper shaft is fixed at its one end to said upper retainer member and slidably engaged at its other end with the upper end portion of said column tube.

6. A steering shaft assembly as set forth in claim 1, wherein said shock absorber element is formed at the opposite ends thereof with a pair of annular tapered portions, one of which is arranged to be coupled over said annular tapered projection.

* * * * *